US009145508B2

(12) United States Patent
Smith

(10) Patent No.: US 9,145,508 B2
(45) Date of Patent: Sep. 29, 2015

(54) COMPOSITION FOR REMOVING SCALE DEPOSITS

(76) Inventor: Ian D. Smith, Adlington (GB)

( * ) Notice: Subject to any disclaimer, the term of this patent is extended or adjusted under 35 U.S.C. 154(b) by 218 days.

(21) Appl. No.: 13/475,030

(22) Filed: May 18, 2012

(65) Prior Publication Data

US 2013/0306323 A1    Nov. 21, 2013

(51) Int. Cl.
*C09K 8/528* (2006.01)
*E21B 37/06* (2006.01)

(52) U.S. Cl.
CPC ...................................... *C09K 8/528* (2013.01)

(58) Field of Classification Search
CPC ....... E21B 21/068; E21B 37/00; E21B 37/08; C09K 8/52; C02F 5/04; C02F 5/08; C02F 5/14; C02F 5/00; C02F 5/528
See application file for complete search history.

(56) References Cited

U.S. PATENT DOCUMENTS

| | | | | |
|---|---|---|---|---|
| 4,357,254 A * | 11/1982 | Kapiloff et al. | ............... | 510/162 |
| 4,532,052 A * | 7/1985 | Weaver et al. | ................ | 507/222 |
| 4,666,625 A | 5/1987 | Shaer et al. | | |
| 4,883,124 A | 11/1989 | Jennings, Jr. et al. | | |
| 4,973,201 A * | 11/1990 | Paul et al. | ...................... | 405/264 |
| 5,268,466 A | 12/1993 | Burdick | | |
| 5,653,917 A * | 8/1997 | Singerman | ............... | 252/389.62 |
| 6,051,200 A | 4/2000 | Glascock et al. | | |
| 6,283,230 B1 | 9/2001 | Peters | | |
| 6,656,366 B1 | 12/2003 | Fung et al. | | |
| 6,880,402 B1 | 4/2005 | Couet et al. | | |
| 7,195,070 B2 | 3/2007 | Delaloye et al. | | |
| 7,199,084 B2 * | 4/2007 | Parris et al. | ................... | 507/136 |
| 7,303,019 B2 * | 12/2007 | Welton et al. | ................. | 166/307 |
| 7,455,112 B2 * | 11/2008 | Moorehead et al. | .......... | 166/307 |
| 7,491,682 B2 | 2/2009 | Gupta et al. | | |
| 7,527,102 B2 * | 5/2009 | Crews et al. | ................... | 166/307 |
| 7,584,791 B2 * | 9/2009 | Robb et al. | .................... | 166/279 |
| 7,700,525 B2 * | 4/2010 | Funkhouser et al. | .......... | 507/246 |
| 7,825,073 B2 * | 11/2010 | Welton et al. | ................. | 507/213 |
| 7,829,509 B2 | 11/2010 | Jones et al. | | |
| 7,851,414 B2 | 12/2010 | Yang et al. | | |
| 7,943,058 B2 | 5/2011 | Hills et al. | | |
| 2002/0150499 A1 | 10/2002 | Reizer et al. | | |
| 2004/0115378 A1 * | 6/2004 | Dunaway et al. | ............ | 428/35.4 |
| 2005/0124519 A1 * | 6/2005 | Sherry et al. | ................... | 510/238 |
| 2006/0065396 A1 * | 3/2006 | Dawson et al. | ............... | 166/279 |
| 2006/0142172 A1 | 6/2006 | Cioletti et al. | | |
| 2006/0243449 A1 * | 11/2006 | Welton et al. | ................. | 166/307 |
| 2007/0135312 A1 | 6/2007 | Melcouci | | |
| 2008/0190609 A1 * | 8/2008 | Robb et al. | .................... | 166/279 |
| 2008/0221003 A1 * | 9/2008 | Meine et al. | ................... | 510/103 |
| 2008/0234147 A1 | 9/2008 | Li et al. | | |
| 2008/0277620 A1 * | 11/2008 | Kesavan et al. | ............... | 252/175 |
| 2009/0029878 A1 | 1/2009 | Bicerano | | |
| 2010/0186956 A1 | 7/2010 | Morgan et al. | | |
| 2011/0028356 A1 | 2/2011 | Jones et al. | | |
| 2011/0089115 A1 | 4/2011 | Lu | | |
| 2012/0067575 A1 | 3/2012 | Luyster et al. | | |

FOREIGN PATENT DOCUMENTS

| | | |
|---|---|---|
| WO | 01/36713 | 5/2001 |
| WO | 2010/126925 | 11/2010 |

OTHER PUBLICATIONS

OSPAR List of Substances Used and Discharged Offshore which Are Considered to Pose Little or No Risk to the Environment (PLONOR), OSPAR Commission (Jun. 2012) pp. 1-8.
OSPAR List of Substances/Preparations Used and Discharged Offshore which Are Considered to Pose Little or No Risk to the Environment (PLONOR) (Reference No. 2004-10) (2008).

* cited by examiner

*Primary Examiner* — Angela M DiTrani
*Assistant Examiner* — Andrew H Sue-Ako
(74) *Attorney, Agent, or Firm* — Carmody Torrance Sandak & Hennessey LLP

(57) ABSTRACT

An aqueous composition for removing scale deposits, especially on subsea equipment and a method of using the same. The aqueous composition comprises (a) a potassium phosphate compound; and (b) acetic acid. The composition is capable of dissolving away into seawater and poses little or no risk to the environment.

13 Claims, No Drawings

COMPOSITION FOR REMOVING SCALE DEPOSITS

FIELD OF THE INVENTION

The present invention relates generally to methods of preventing or reducing scale formation on surfaces, especially in subsea environments.

BACKGROUND OF THE INVENTION

Scale formation typically involves the precipitation and deposition of dense materials on surfaces made of metal and other materials. Scale formation may occur when inorganic mineral salts (including, for example, calcium carbonates, calcium sulfates, calcium oxalates and barium sulfates) precipitate from liquids and deposit on the surfaces of a system (including, boilers, evaporators, reactors, cooling water systems, heat exchangers, pipes, filter cloths, reverse osmosis membrane surfaces, oil wells, and desalination evaporators, among others).

Scale formation may cause a number of operation problems, including, but not limited to, plugging of equipment, pressure loss, increased utility costs, reduced heat exchange capacity, corrosion, lost production due to downtime, and downgraded products resulting from insufficient feeds. Scaling equipment may occur in a variety of industries. For example, in the petroleum industry, scale deposition costs millions of dollars every year and is one of the leading causes in production decline worldwide. Scale deposition is recognized as one of the top production problems in regions that are prone to scale, such as the North Sea, the United States and Canada.

Scale can be deposited in various equipment along various water paths, including, but not limited to, piping, injectors, reservoirs and surface equipment. Scale formation at oil-producing wells also may eventually result in lower oil yields and in well failure. Scale found in oil fields may form by direct precipitation from naturally-occurring water in reservoir rocks, or as a result of water becoming over-saturated with scale-forming species when two incompatible water streams combine. Furthermore, scale may also form when an oil or gas well produces water, or alternatively, when water injection is used to enhance recovery.

Natural water in oil fields may contain dissolved substances acquired through contact with mineral phases in the natural environment. Deep subsurface water may be enriched in soluble ions through alteration and dissolution of minerals. The water in sandstone reservoirs or geological formation water that have contact with sea water may contain abundant scale-forming ions, including but not limited to $Ca^{2+}$, $Mg^{2+}$, $Ba^{2+}$, $Sr^{2+}$, $Na^+$, $K^+$, $CO_3^{2-}$, $SO_4^{2-}$, and $Cl^-$. Sea water is also generally rich in scale-forming ions, including ions that are by-product of marine life and water evaporation. In off-shore oil production, the formation of sulfate scales may occur when sea water, which may be rich with $SO_4^{2-}$ and formation water containing high concentrations of barium and calcium are mixed.

Furthermore, oil field scale may form when the state of any natural fluid is altered, such that the solubility limit for one or more components is exceeded. Temperature and/or pressure changes, pH shift, out-gassing, and/or the contact with incompatible water may cause the water to become oversaturated with scale-prone species and lead to the formation of scale.

Barium and strontium sulfate scales may, for example, be particularly troublesome when sulfate-rich seawater is used as an injection fluid in oil wells whose formation water is rich in barium ions. Barium and strontium sulfate generally form very hard, very insoluble scales that can be difficult to prevent by conventional chemical-based scale inhibition techniques. In some instances, this can be particularly troublesome, as barium and strontium sulfates can co-precipitate with radium sulfate, making the scale mildly radioactive. Dissolution of sulfate scales in piping is generally difficult to remove, possibly requiring one or more of high pH, long contact times, heat, high pressure, and high velocity circulation.

Barium sulfate, as well as other inorganic supersaturated salts, may precipitate onto the various formations to form a scale, thereby clogging the formations and restricting the recovery of oil from a reservoir. The insoluble salts may also precipitate onto production tubing surfaces and associated extraction equipment that may, for instance, limit productivity, limit production efficiency, and compromise safety. Certain oil-containing formation waters are known to contain high barium concentrations of 400 ppm and higher. Since barium sulfate forms a particularly insoluble salt, the solubility of which declines rapidly with temperature, it can be difficult to inhibit scale formation and to prevent plugging of the oil formation and topside processes and safety equipment.

Scale inhibitors can be used in production wells to prevent scaling in the formation and/or in the production lines down in the hole and at the surface. Scale build-up decreases permeability of the formation, reduces well productivity and shortens the lifetime of production equipment. Various scale inhibitors are known and include chelating agents, phosphates, phosphonates (organophosphates), polycarbonates, and components of polymers, have been developed to inhibit or reduce the formation of inorganic scales, as described for example in U.S. Pat. No. 7,943,058 to Hills et al., U.S. Pat. No. 7,491,682 to Gupta et al., and U.S. Pat. Pub. No. 2011/0089115 to Lu, the subject matter of each of which is herein incorporated by reference in its entirety. These scale inhibitors typically work by one of the following mechanisms: precipitation threshold inhibition, dispersion, and crystal distortion/modification.

Various methods are also known for introducing these scale inhibitors into production wells. For instance, a liquid inhibitor may be forced into the formation by application of hydraulic pressure from the surface which forces the inhibitor into the targeted zone. Alternatively, the delivery method may consist of placing a solid inhibitor into the producing formation in conjunction with a hydraulic fracturing operation.

Notwithstanding the use of scale inhibitors, once scale has deposited or formed on surfaces, it is necessary that such scale deposits be removed so that the equipment can continue to operate properly. However, strict environmental regulations for the North Sea, as well as many other areas, have required oil field service companies to formulate their products so that their effect on the marine environment is minimized and the components of the products comprises only approved components.

Using acids to dissolve calcium and other scale deposits in subsea environments is known. Calcium deposits build up on subsea components and eventually interfere with the operation of the components, including connectors and mechanical external valve components, from functioning. High pressure water jets and mild water jets are commonly used to clean equipment. The strength of the acid is also typically kept low to avoid corrosion and degradation of metallic and elastomeric materials on the subsea equipment and a constant flow of acid is required to maintain an acidic environment around the area being cleaned.

For use in the North Sea, chemical products are categorized into one of four categories based on the ecotoxicological properties of its components. The four categories, each designated by color, are as follows:
(1) Black—forbidden to use or discharge;
(2) Red—high priority for phasing out via substitution;
(3) Yellow—environmentally acceptable; and
(4) Green—only for chemicals listed on the OSPAR Convention for the Protection of the Marine Environment of the North East Atlantic PLONOR (Pose Little Or No Risk) database.

Thus, for oil and gas drilling operations in the North Sea, companies are required to phase out the use of Black and Red components in their products and to use only chemicals which are entirely comprised of "Green" components in any new products.

Thus, there remains a need in the art for an improved composition for removing scale deposits from surfaces, especially in subsea environments that contains at least substantially only chemicals listed on the OSPAR Convention for the Protection of the Marine Environment of the North East Atlantic PLONOR (Pose Little Or No Risk) database.

SUMMARY OF THE INVENTION

It is an object of the present invention to provide an improved composition for removing scale deposits containing at least substantially only chemicals listed on the OSPAR Convention for the Protection of the Marine Environment of the North East Atlantic PLONOR database.

It is another object of the present invention to provide an improved composition that can be varied in density.

It is still another object of the present invention to provide an improved composition that can be used without requiring a shroud.

It is still another object of the present invention to provide an improved composition that is capable of dissolving away in seawater.

It is yet another object of the present invention to provide an improved method of inhibiting scale on or in subsea equipment.

To that end, in one embodiment, the present invention relates generally to an aqueous composition for removing scale deposits, the aqueous composition comprising:
a) an alkali metal phosphate compound; and
b) acetic acid.

In another embodiment, the present invention relates generally to a method of removing scale deposits on a surface, the method comprising the steps of:
a) contacting the surface with an aqueous composition comprising:
i) an alkali metal phosphate compound; and
ii) acetic acid; and
b) maintaining contact between the surface and the aqueous composition for a suitable period of time to cause scale deposits on the surface to separate from the surface.

DETAILED DESCRIPTION OF THE PREFERRED EMBODIMENTS

The present invention relates generally to an aqueous composition for removing scale deposits, the aqueous composition comprising:
a) an alkali metal phosphate compound; and
b) acetic acid.

Scale may form from a scale-forming fluid, or scale may form from the interaction of scaling compounds present in more than one scale-forming fluid. The scale-forming fluid may be water, including, for example, tap water, purified water, recycled process water, reservoir water, geological subsurface water, seawater, brine, and hard water, or the scale forming-fluid may be oil, another process fluid, or combinations of one or more of the foregoing.

The scale deposits may include any substance present in at least one scale-forming fluid that may participate in or cause the formation of scale during the administration of a given process. In one embodiment, the at least one scaling compound is an inorganic salt. Exemplary inorganic salts include, but are not limited to, calcium carbonate, calcium sulfate, calcium oxalate, magnesium carbonate, and barium sulfate. In another embodiment, the at least one scaling compound is at least one scale-forming ion. Exemplary scale-forming ions include, but are not limited to, $Ca^{2+}$, $Mg^{2+}$, $Ba^{2+}$, $Sr^{2+}$, $Na^+$, $K^+$, $OH^-$, $NO_3^-$, $CO_3^{2-}$, $SO_4^{2-}$, $PO_4^{3-}$, $HPO_4^{2-}$, $H_2PO_4^-$, $C_2O_4^{2-}$, $SiO_3^{2-}$, $F^-$, and $Cl^-$.

The acetic acid typically comprises a 50% v/v solution of acetic acid. The acetic acid is typically present in the aqueous composition at a concentration of between about 25 and about 500 grams/liter, more preferably at a concentration of between about 100 and about 200 grams/liter.

The alkali metal phosphate compound is preferably selected from those potassium phosphate compounds that are on the PLONOR list of selected chemicals. For example, the potassium phosphate compounds may be selected from the group consisting of potassium phosphate dibasic, potassium phosphate tribasic, potassium phosphate monobasic, phosphoric acid potassium salt (2:1), and combinations of one or more of the foregoing. In a preferred embodiment the potassium phosphate compound comprises phosphoric acid potassium salt (2:1). One additional advantage of using potassium phosphate compounds in the compositions of the present invention is that the composition becomes essentially self-preserving without the need for additional preservatives, which are typically not on the PLONOR list of selected chemicals. The preferred potassium phosphate compound is potassium dihydrogen phosphate.

The alkali metal phosphate compound is preferably present in the composition at a concentration of between about 100 and about 400 grams/liter, more preferably at a concentration of between about 200 and about 350 grams/liter.

The aqueous composition can be thickened by the addition of a cellulosic thickener. The use of a cellulosic thickener enables the material to be pumped into voids or on the surface of a piece of equipment as a shear thinned fluid, which increases in viscosity on location. Once applied, sea currents have a much reduced effect in decreasing contact time without the need for a shroud. The cellulosic thickener is preferably a cellulose ether. More particularly, the cellulosic thickener may comprise a cellulose ether selected from the group consisting of ethyl cellulose, hydroxyethyl cellulose, methyl cellulose hydroxypropyl cellulose, ethyl hydroxyethyl cellulose, methyl hydroxyethyl cellulose, hydrophobically modified hydroxyethyl cellulose, hydrophobically modified ethyl hydroxyethyl cellulose, hydrophobically modified methyl hydroxyethyl cellulose, methyl hydroxypropyl cellulose, carboxymethyl hydroxyethyl cellulose, and combinations of one or more of the foregoing. In a preferred embodiment, the cellulosic thickener comprises ethyl cellulose, hydroxyethyl cellulose, or a combination thereof, both of which are on the PLONOR list of acceptable chemicals. Hydroxyethyl cellulose is especially preferred.

If used, the cellulosic thickener is preferably present in the composition at a concentration of between about 0.5 and about 25 grams/liter, more preferably at a concentration of between about 1.0 and about 10 grams/liter.

In addition, a water miscible solvent may be added to the composition of the invention for lower pour point stability or to adjust the density of the product so that the product can float up into cap areas or down into well areas or remain buoyant around vertical structures. In a preferred embodiment, the solvent comprises monoethylene glycol (MEG), which is also on the PLONOR list of acceptable chemicals. Other similar solvents which are on the PLONOR list of acceptable chemicals, including glycerol may also be used in the practice of the invention. The exact concentrations of the water miscible solvents may depend on the desired thermal conductivities and the type of water miscible solvents.

If used the additional solvent is preferably present in the composition at a concentration of between about 50 and about 500 grams/liter, more preferably at a concentration of between about 100 and about 250 grams/liter.

The product described herein will also eventually dissolve away into seawater.

The optimum activity level of the acid and retention time to give good de-calcification performing without destroying subsea equipment materials is determined by the degree of contamination, temperature, and the type of product application method chosen. This will vary between applications. For example various viscosity options of the fluid are developed with various densities, i.e., lower than seawater, higher than seawater and buoyant. In one embodiment a specific gravity between about 1.020 and 1.029 is preferred.

Other additives including yellow metal inhibitors, surfactants, chelating agents, acids, solvents, leak tracing dye and/or biocide may also be added to the composition of the invention. However, the use of these additives may compromise the PLONOR status of the composition if such additives are not on the PLONOR list of acceptable chemicals. It is preferable for the composition to include acids other than acetic acid. Preferable secondary acids include phosphoric acid (especially if partially neutralized), PEK acid (CAS No. 14887-42-4), formic acid and citric acid.

Surfactants such as anionic, nonionic, cationic and amphoteric surfactants may also be used. Suitable anionic surfactants include, but are not necessarily limited to, alkyl sulfates, sulfonates, sulfosuccinates, phosphates, alkyl benzene sulfonates and the like. Other suitable anionic surfactants include, but are not necessarily limited to, fatty carboxylates, alkyl sarcosinates, alkyl phosphates, alkyl sulfonates, alkyl sulfates and the like and mixtures thereof. The alkyl chain length on the surfactants may range from 8 to 24 carbon atoms.

Suitable nonionic surfactants include, but are not necessarily limited to, alkoxylated alcohols or ethers, alkyl ethoxylates, alkylamido ethoxylates, alkylamine ethoxylates, alkyl glucosides, alkoxylated carboxylic acids, sorbitan derivatives, again where the alkyl chain length may range from 8 to 24 carbon atoms. More specific examples include, but are not necessarily limited to nonylphenol ethoxylate-3, alkyl ethoxylates-3, oleyl carboxylic diethylamides, and the like and mixtures thereof.

Suitable surfactants and mixtures thereof include, but are not necessarily limited to, cationic surfactants such as, monoalkyl quaternary amines, such as cocotrimethylammonium chloride, cetyltrimethylammonium chloride, stearyltrimethylammonium chloride, soyatrimethylammonium chloride, behentrimethylammonium chloride, and the like and mixtures thereof. Other suitable cationic surfactants that may be useful include, but are not necessarily limited to, dialkylquarteramines such as dicetyldimethylammonium chloride, dicocodimethylamtnonium chloride, distearyldimethylammonium chloride, and the like and mixtures thereof.

The present invention also relates generally to method of removing scale deposits on a surface, the method comprising the steps of:
    a) contacting the surface with an aqueous composition comprising:
        i) a potassium phosphate compound; and
        ii) acetic acid; and
    b) maintaining contact between the surface and the aqueous composition for a suitable period of time to cause scale deposits on the surface to separate from the surface.

In one embodiment, the surface is an area of a well in a seawater environment, such as a cap area or a well area. However, the surface may also comprises other surfaces on which scale has a tendency to form, especially in a seawater environment. addition, by using only ingredients that are on the PLONOR list of selected chemicals, the aqueous composition is capable of dissolving away into seawater and poses little or no risk to the environment.

The aqueous composition preferably has a specific gravity of between about 1.020 and 1.30, more preferably 1.1 and 1.2 at 15.6° C.

The aqueous composition preferably has a viscosity of between about $2^{cs}$ and about $5^{cs}$ at 40° C., as measured in centistokes (cs).

The aqueous composition preferably has a density of between about 1.1 g/cm$^3$ and about 1.2 g/cm$^3$.

The retention time, i.e., the time that the surface is contacted with the aqueous composition is typically between about 20 and about 120 minutes, more preferably between about 30 and about 60 minutes, depending on temperature and the type of application method.

It is also to be understood that the following claims are intended to cover all of the generic and specific features of the invention described herein and all statements of the scope of the invention which as a matter of language might fall therebetween.

What is claimed is:

1. A method of removing scale deposits on a surface, wherein the surface comprises a cap area of a well in seawater, and wherein the scale deposits comprise an inorganic salt selected from the group consisting of calcium carbonate, calcium sulfate, calcium oxalate, magnesium carbonate and barium sulfate, the method comprising the steps of:
    a) contacting the surface with an aqueous composition consisting essentially of:
        i) 100 to 400 g/L of an alkali metal phosphate compound;
        ii) 25 to 500 g/L of a 50% v/v solution of acetic acid
        iii) 0.5 to 25 g/L of a cellulosic thickener, wherein the cellulosic thickener is selected from the group consisting of ethyl cellulose, hydroxyethyl cellulose, methyl cellulose hydroxypropyl cellulose, ethyl hydroxyethyl cellulose, methyl hydroxyethyl cellulose, methyl hydroxypropyl cellulose, carboxymethyl hydroxyethyl cellulose, and combinations of one or more of the foregoing; and
        iv) 50 to 100 g/L of a water miscible solvent;
    b) maintaining contact between the surface and the aqueous composition for a suitable period of time to cause scale deposits on the surface to separate from the surface;
    wherein the aqueous composition is capable of dissolving away into seawater.

2. The method according to claim 1, wherein the aqueous composition has a specific gravity of between about 1.1 and about 1.2 at 15.6° C.

3. The method according to claim 1, wherein the aqueous composition has a viscosity of between about $2^{cs}$ and about $5^{cs}$ at 40° C.

4. The method according to claim 1, wherein the aqueous composition has a density of between about 1.1 g/cm$^3$ and about 1.2 g/cm$^3$.

5. The method according to claim 1, wherein the surface is contacted with the aqueous composition for a period of about 30 to about 60 minutes.

6. A method according to claim 1 wherein the method further comprises the step of adjusting the specific gravity of the aqueous composition such that the aqueous composition either floats to, sinks to, or hovers at, the surface being contacted with the aqueous composition.

7. The method according to claim 1, wherein the alkali metal phosphate compound is selected from the group consisting of potassium phosphate dibasic, potassium phosphate tribasic, potassium phosphate monobasic, phosphoric acid potassium salt (2:1), and combinations of one or more of the foregoing.

8. The method according to claim 1, wherein the alkali metal phosphate compound is present in the aqueous composition at a concentration of between about 200 and about 350 grams/liter.

9. The method according to claim 1, wherein the acetic acid is present in the aqueous composition at a concentration of between about 100 and about 200 grams/liter.

10. The method according to claim 1, wherein the cellulosic thickener is ethyl cellulose, hydroxyethyl cellulose or combinations of one or more of the foregoing.

11. The method according to claim 1, wherein the cellulosic thickener is present in the aqueous composition at a concentration of between about 1 and about 10 grams/liter.

12. The method according to claim 1, wherein the water miscible glycol solvent comprises monoethylene glycol.

13. A method of removing scale deposits on a surface, wherein the surface comprises a cap area of a well in seawater, and wherein the scale deposits comprise an inorganic salt selected from the group consisting of calcium carbonate, calcium sulfate, calcium oxalate, magnesium carbonate and barium sulfate, the method comprising the steps of:
   a) contacting the surface with an aqueous composition consisting essentially of:
      i) 100 to 400 g/L of an alkali metal phosphate compound;
      ii) 25 to 500 g/L of a 50% v/v solution of acetic acid
      iii) 0.5 to 25 g/L of a cellulosic thickener, wherein the cellulosic thickener is selected from the group consisting of ethyl cellulose, hydroxyethyl cellulose, methyl cellulose hydroxypropyl cellulose, ethyl hydroxyethyl cellulose, methyl hydroxyethyl cellulose, methyl hydroxypropyl cellulose, carboxymethyl hydroxyethyl cellulose, and combinations of one or more of the foregoing;
      iv) a secondary acid selected from the group consisting of phosphoric acid, partially neutralized phosphoric acid, PEK acid, formic acid and citric acid; and
      v) 50 to 100 g/L of a water miscible solvent;
   b) maintaining contact between the surface and the aqueous composition for a suitable period of time to cause scale deposits on the surface to separate from the surface;
wherein the aqueous composition is capable of dissolving away into seawater.

\* \* \* \* \*